United States Patent [19]

Scott

[11] 4,313,608

[45] Feb. 2, 1982

[54] MEANS FOR CONTROLLING FLUID FLOW

[75] Inventor: Peter A. J. Scott, Brighouse, England

[73] Assignee: Associated Engineering Limited, Warwickshire, England

[21] Appl. No.: 102,609

[22] Filed: Dec. 12, 1979

[30] Foreign Application Priority Data

Dec. 20, 1978 [GB] United Kingdom ............... 49338/78

[51] Int. Cl.³ ............................................. F16J 15/34
[52] U.S. Cl. ........................................ 277/27; 277/74; 277/65
[58] Field of Search .................... 277/81 R, 96, 96.1, 277/59, 65, 71, 72 R, 74, 3, 27, 75

[56] References Cited

U.S. PATENT DOCUMENTS

| 1,315,822 | 9/1919 | Doran ........................ 277/96.1 X |
| 2,467,960 | 4/1949 | Brady ............................ 277/74 X |
| 2,480,908 | 9/1949 | Davies ............................ 277/96 |
| 2,555,492 | 6/1951 | Kidney .......................... 277/74 X |
| 2,895,751 | 7/1959 | Standish ........................ 277/74 X |
| 3,015,506 | 1/1962 | Tracy ........................ 277/96.1 X |
| 3,144,253 | 8/1964 | Schirmer ...................... 277/74 X |
| 3,235,273 | 2/1966 | Bialkowski ................. 277/96.1 X |
| 3,462,159 | 8/1969 | Baumann et al. ............... 277/74 X |
| 3,499,653 | 3/1970 | Gardner ...................... 277/96.1 X |
| 3,572,727 | 3/1971 | Greiner ............................ 277/74 |
| 3,738,667 | 6/1973 | Symons ........................ 277/96.1 |
| 3,788,652 | 1/1974 | Hirtz et al. ..................... 277/71 |
| 3,979,104 | 9/1976 | LaCoste et al. ................ 277/74 X |
| 4,114,900 | 9/1978 | Wiese .......................... 277/74 X |

FOREIGN PATENT DOCUMENTS

| 531064 | 8/1954 | Belgium ........................ 277/74 |
| 1470121 | 1/1967 | France ........................... 277/71 |
| 131440 | 4/1929 | Switzerland .................. 277/96.1 |
| 384536 | 12/1932 | United Kingdom ............... 277/96 |
| 817396 | 7/1959 | United Kingdom ............... 277/74 |
| 859647 | 1/1961 | United Kingdom ............... 277/71 |

Primary Examiner—Robert S. Ward, Jr.
Attorney, Agent, or Firm—Biebel, French & Nauman

[57] ABSTRACT

A flow control means has two opposed co-operating faces between which fluid is introduced at an inlet zone so as to flow radially towards at least one downstream zone, one face being loaded or loadable towards the other face and comprising a pressure-deflectable elastic or elastically loaded element which is deflectable to provide a clearance between the co-operating faces which is convergent towards the or each downstream zone.

11 Claims, 3 Drawing Figures

MEANS FOR CONTROLLING FLUID FLOW

BACKGROUND OF THE INVENTION

1. Field of the Invention

This invention relates to means for controlling fluid flow, and has especial though not exclusive application to means for controlling a flow of cooling fluid passing in contact with the reverse face of a working element which forms one of two relatively rotatable sealing faces of a positive clearance face seal.

In high-speed machinery, such as turbo-compressors, high-speed pumps, turbo-alternators, tyre cord winders and bobbin winders, that is machines where the shaft peripheral speed is of the order of 100 meters per second, conventional radial face seals have not been generally successful.

Even a positive clearance radial face seal generates considerable viscous shearing power between its two opposed sealing (working) faces and because of the close operating clearances, the clearance control fluid flow between faces is often of insufficient thermal capacity to act as a sink for this power loss without exceeding a temperature which would permanently alter the properties of the control fluid adversely.

Furthermore, heat generated in the planar working elements of power clutch couplings and braking system retarders for example can give rise to clutch and brake fade if the heat is not dissipated rapidly.

2. Description of the Prior Art

The working elements of radial face seals have been cooled by means of impingement cooling as by circumferentially distributed cooling jets which, however, do not provide any significant pressure support for the wall of the working element which constitutes a thermal barrier whose thickness therefore cannot be reduced to increase the heat transfer across the wall if it is to remain largely flat. Moreover, impingement cooling gives rise to non-uniform distribution of the cooling flow around the circumference providing differential cooling which is unsatisfactory in positive clearance radial face seals.

SUMMARY OF THE INVENTION

One of the objects of the present invention is to produce a flow of cooling fluid which provides significant pressure support for the wall of an annular working element to reduce the heat transfer resistance of the thermal path through the wall. Another object is to provide an even circumferential flow distribution of cooling fluid over the reverse face of an annular working element, with a high surface heat transfer coefficient thereon.

According to the present invention, means for controlling fluid flow is characterized by two opposed co-operating annular faces, means for introducing a fluid flow between said faces, at an inlet zone of the flow control means so as to flow radially towards at least one downstream zone of the flow control means, and by one of said faces being loaded or loadable towards the other of said faces and comprising a pressure-deflectable elastic or elastically loaded element which, in operation, is deflected to provide a clearance between the co-operating faces which is convergent towards the or each downstream zone of the flow control means.

The flow control means according to the invention provides, in operation, a cooling fluid pressure distribution over the other of said co-operating faces so that when it forms the reverse face of a working element, the pressure distribution supports the wall of the working element enabling it to be much thinner than would otherwise be the case and thus providing a low heat transfer resistance with consequential enhanced cooling. The deflection of the deflectable element in combination with the load thereon enables a fluid film of considerable stiffness (i.e. the rate of change of fluid film thickness in relation to load) to be maintained between the co-operating face and thus provides a cooling flow which is controlled and evenly distributed circumferentially over the co-operating face. This is of particular importance in positive clearance radial face seals where stability is essential for satisfactory operation, since it avoids differential circumferential cooling which would cause de-stabilizing hydrodynamic effects between the working faces due to thermo-elastic deflections.

By means of the invention, the clearance between the co-operating faces is precisely controlled, allowing the use of small clearances without significant circumferential variations, thereby generating a uniformly distributed and high surface heat transfer co-efficient at the reverse face of the working element. The invention also avoids the necessity of accurately machining a co-operating face of the flow control means to a stepped or tapered form; both co-operating faces may be machined radially flat, which is a relatively simple operation. Even with a thin-walled working element, the other face of the flow control means can be maintained in a substantially flat condition to ensure adequate load capacity and stiffness of the fluid film between the co-operating faces.

The working element may itself comprise a pressure-deflectable element as is the case in the positive clearance radial face seals described in our U.K. Patent Specification No. 2033978. In such face seals the flow control means assembly may comprise a pressure-deflectable element which consists of an annular member which has rigid radially inner and outer rings, of which one is axially movable, supporting an intermediate elastic element, and an annular part which supports the other of the rings of the deflectable element and radially locates and seals to the axially movable ring. This provides a region of low pressure behind at least part of the deflectable element and a load on both the inner and outer rings. The net load on the back face of the upstream, axially movable, ring is referred to as the preload on the deflectable element. The annular part which is itself axially movable is radially located and sealed within an annular carrier supporting the deflectable working element of the seal so that the load on the flow control means assembly, determining the cooling flow, is transmitted to a part of the reverse face of the deflectable working element to provide a preload thereon.

The provision of a preload to the flow control deflectable element and the transmission of the total load on the flow control means assembly to act as a preload on the deflectable working element, increases the stiffness of the fluid films between the co-operating faces of the flow control means and working faces of the seal respectively considerably, for example by a factor of 10.

In a preferred embodiment, the annular carrier member is axially loaded or loadable in the direction of the working element which comprises a substantially rigid downstream ring supported by the annular carrier member and connected to a relatively thin flexible upstream annular member to a part of which is transmitted the whole of the load on the flow control means and a relatively small pressure differential is provided across the said part of the flexible annular member in the upstream zone of the flow control means and the working element. This small pressure differential may be achieved in such a construction where a buffer fluid is used also as the cooling fluid in a radial face seal by arranging the inlet zones of the flow control means and seal working faces respectively adjacent each other or additionally when the cooling fluid supplied to the flow control means is sealed with respect to the sealed high pressure fluid, by supplying the two fluids at substantially the same pressure.

The annular part of the flow control means, may be radially located within and sealed to the annular carrier by any appropriate means of a stiffness which is less than that of the film between the co-operating faces, such as an annular sealing ring or, preferably, an annular membrane seal. This enables the flow control assembly to be free to orient itself to deflections of the working element and thus permit the controlled clearance between the co-operating faces of the flow control means to be maintained.

The invention is also applicable to vapour seals in which there is difficulty in controlling the location where vapourization takes place since the flow control means can be used to localize cooling to a selected circumferential region of at least one of the working elements of the vapour seal.

The flow control means according to the invention produces a flow which is proportional to the fourth power of the pressure drop across its annular co-operating faces in contrast to the linear or square root relationships which obtain respectively in laminar and turbulent flow restrictors such as capilliary tubes and orifices respectively, used for conventional hydrostatic bearing control.

It should be noted that in a deflecting working element positive clearance buffer face seal, the effectiveness of the geometrical convergence between the seal working faces in generating film stiffness will be reduced by any decrease in fluid viscosity as the clearance control fluid rises in temperature downstream. By means of the invention the potential adverse effects of viscosity changes are controlled.

BRIEF DESCRIPTION OF THE DRAWINGS

In order that the invention may be more clearly understood, reference will now be made to the accompanying drawings, in which.

DESCRIPTION OF THE PREFERRED EMBODIMENTS

Figure 1:
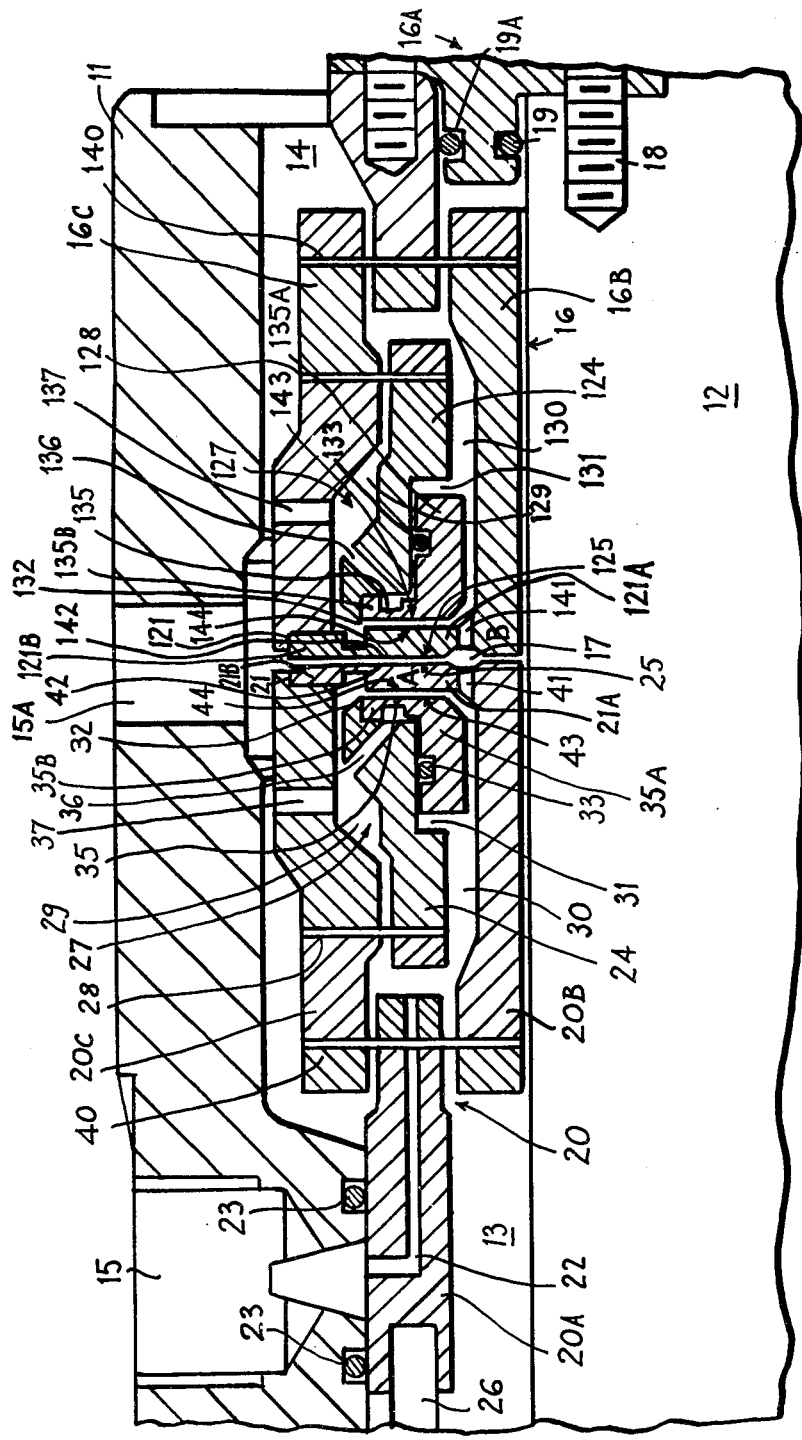
FIG. 1 is a section of one embodiment of positive clearance radial face seal having two relatively rotatable sealing faces, and incorporating a flow control means according to the invention.

Referring to FIG. 1 of the drawings, a housing 11 is provided with a hole through which passes a rotatable shaft 12, and it is necessary to provide a seal between a region 13 of fluid at high pressure and a region 14 of fluid at low pressure.

A backplate 20 is mounted, by means of a mounting part 20A thereof, in the housing with a clearance around the shaft 12, and is in sealed engagement with the housing 11 by means of annular sealing rings 23 and is prevented from rotation by a pin 26.

The right-hand end portion of the backplate (as seen in the drawing) constitutes one working element 21 which forms one of two relatively rotatable sealing faces 25 of a positive clearance radial face seal.

A collar 16 is mounted to rotate with the shaft 12 by means of a mounting part 16A of the collar, the mounting part 16A being keyed to the shaft by a screw-threaded bolt 18 or other suitable means such as a pin. The mounting part 16A comprises two portions which are bolted together, and annular sealing rings 19 and 19A prevent leakage between the collar mounting part 16A and shaft 11 and mounting part portions respectively. The left-hand end portion of the collar 16 (as seen in the drawing) constitutes another working element 121 which forms the other face 125 of the two relatively rotatable sealing faces of the face seal.

The face seal operates as described in our U.K. Patent Specification No. 2033978 to which reference should be made.

The face seal illustrated in the present application is of the buffer type, and fluid at a higher pressure than that in region 13 is fed through conduit 15 in the housing 11 to a passage 22 in the backplate part 20A, and thence to a region 17 between the inner and outer periphery of the faces 25, 125. There will therefore be a flow of fluid from region 17 radially inward over cooperating areas B of the faces 25, 125 to the region 13, and also a flow of fluid from region 17 radially outward over co-operating areas A of the faces 25, 125 to the region 14. Outwardly flowing buffer fluid is exhausted to drain and subsequent re-circulation through a conduit 15A in the housing 11.

Faces 25, 125 are machined radially flat in manufacture. The working elements 21, 121 of the backplate and collar comprise radially inner and outer rigid rings 21A, 21B and 121A, 121B joined by flexible intermediate portions 42, 142 thereby forming a pressure-deflectable elastic element, such that, in operation, owing to the differential pressure distribution over the deflectable element it will deflect to afford a convergent passage between faces 25, 125. The seal is so dimensioned that, in operation, the minimum clearance between the faces 25, 125 occurs at the outer periphery of areas A and is of the order of 0.01 mm. It should be noted that a rebate is provided near the outer periphery to accommodate fastening means, e.g. bolt-holes, bolt-heads, etc., and this rebate is set back from the sealing face by a much greater amount than the gap, and therefore the rebated portion does not form part of the sealing face.

The flow of sealing fluid between faces 25, 125, one of which is rotating at high speed relative to the other, generates a large amount of heat, mainly due to shear of the fluid film.

To dissipate this heat, the arrangement now to be described is employed. The arrangement shown is substantially identical in the collar 16 and in the back plate 20, except that one is a mirror image of the other as seen in the drawing. To avoid duplication, the two cooling arrangements will be described, together.

An annular part 24, 124 is provided within a space 27, 127, inside a double-walled annular carrier member 20B, 16B of the backplate 20 and collar 16 respectively, the carrier member 20B, 16B being supported and located radially by a flexible metal diaphragm or membrane seal 40, 140 from the mounting part 20A, 16A. Annular part 24, 124 is supported and located radially by a flexible metal diaphragm or membrane seal 28, 128 from the carrier member 20B, 16B, thus dividing the space 27, 127 into two zones 29, 129 and 30, 130 at lower and higher relative pressures respectively.

The annular part 24, 124 is formed with a stepped annular groove 31, 131 opening towards the shaft 12 and the reverse face of the respective working element 21, 121. An L-section annular member 32, 132, providing a pressure-deflectable element, comprises a thick, substantially rigid radially inner upstream ring 35A, 135A in axial sliding engagement with the groove 31, 131 and sealed in the groove by an annular sealing ring 33, 133. The radially outer part of the L-section member consists of a substantially rigid downstream ring 35B, 135B which is supported by the annular part 24, 124 and the two rings 35A and 135A, 35B and 135B are joined by a thinner, flexible, intermediate portion 35, 135. Thus the cooling arrangement in each of the backplate 20 and collar 16 comprises two co-operating faces of which one face 43, 143 is formed by the flexible L-section member 32, 132 and the other face 44, 144 is formed by a part of the reverse face of the working element 21, 121. The faces 43, 44 and 143, 144 co-operate in a similar manner to that in which the seal faces 25, 125 co-operate with each other, except that faces 43, 44 and 143, 144 are not relatively rotatable.

Zone 30, 130 extends around the inner periphery of the annular part 24, 124 and L-section member 32, 132 and is in communication with the region 17 through peripheral holes 41, 141 through faces 25, 125, the holes 41 being in communication with the source 15 of high pressure fluid from the passage 22 in the mounting part 20A of the backplate. Although some of this fluid leaks away between seal faces 25, 125 to drain, nevertheless the peripheral holes 41, 141 may be treated as though they were at substantially the same pressure as the high-pressure source.

It will be apparent that the left-hand ends of part 24 and member 32, and the right-hand ends of part 124 and member 132 will be subjected to this high pressure thus loading the deflectable element 32, 132 towards the co-operating face 44, 144 and sharing the load between the inner and outer rings 35A, 135A and 35B, 135B. The net load acting on rings 35A and 135A respectively, discounting that caused by the pressure distribution between the co-operating faces 43, 44 and 143, 144 represents a preload acting on the L-section member 32, 132. Moreover, the pressures acting on the left and right hand ends of the carrier members 20B, 16B respectively are balanced, so that the back plate 20 and collar 16 are axially loaded towards each other and the whole of the load on the flow control assembly is transmitted to the part of the reverse face of working element 21, 121, which forms the co-operating face 44, 144.

The zone 29, 129 radially outward of L-section members 32, 132, and the spaces between the rear of the flexible portions of the L-section members and the sealing rings 33, 133, are connected to the lowest pressure of the system in region 14 through holes 36, 136 and 37, 137.

In operation, there is a flow of fluid from the zone 30, 130, in the radial sense, outward from the inlet zone of the cooling arrangement at the inner periphery of the faces 43, 44 and 143, 144 to the outer periphery of these faces, that is towards the downstream zone of the cooling arrangement, and this flow creates a pressure distribution over the reverse faces of the working elements 21, 121 which varies from the high pressure at 30, 130 to the low pressure of region 14. This pressure distribution supports the walls of the working elements 21, 121 so that the thickness of these walls can be minimized for maximum cooling. Thus, because these walls are relatively thin, they can be made of low conductivity materials, for example stainless steels selected for their corrosion resistance.

The faces 43, 143 of the L-section members 32, 132 will be so dimensioned and arranged that, although machined flat in manufacture, they deflect in operation so that the minimum clearance between them and the co-operating faces 44, 144 occurs at or near the outer periphery of the co-operating faces. The minimum clearance may be of the order of 0.05 mm.

Moreover, the diaphragm seals 28, 128 and 40, 140 respectively enable the flow control means assembly to move axially to accommodate relative movements between the co-operating face 44, 144 and parts 20C, 16C of the carrier member 20B, 16B and allow relative axial movements between the carrier member parts 20C, 16C and the remainder of the carrier member 20B, 16B, and establish the requisite film stiffness between the co-operating faces 43 and 44, 143 and 144. The flexible diaphragms provide a quasi-static seal between the pressure regions and zones and provide for self-alignment of the seal parts bearing the co-operating faces and sealing faces. The stiffness of the diaphragms is chosen to be less than that of the fluid film between the respective co-operating faces and sealing faces. Thus in the case of the diaphragm 40, 140 which takes the torque transmitted by the relative rotation between housing and shaft, the axial and angular stiffness is less than that between the sealing faces 25, 125 and in the case of the diaphragm 28, 128 the stiffness is less than that of the fluid film between the co-operating faces 43 and 44, 143 and 144. The film between the sealing faces 25, 125 has an axial stiffness which is greater than that of the flexible portion 42, 142 of the working element 21, 121.

Thus, the flow of cooling fluid over the reverse faces of the working elements 21, 121 is controlled by the clearance between the co-operating faces 43, 44 and 143, 144 and is evenly distributed circumferentially over the reverse face of the working element 21, 121.

Figure 2:
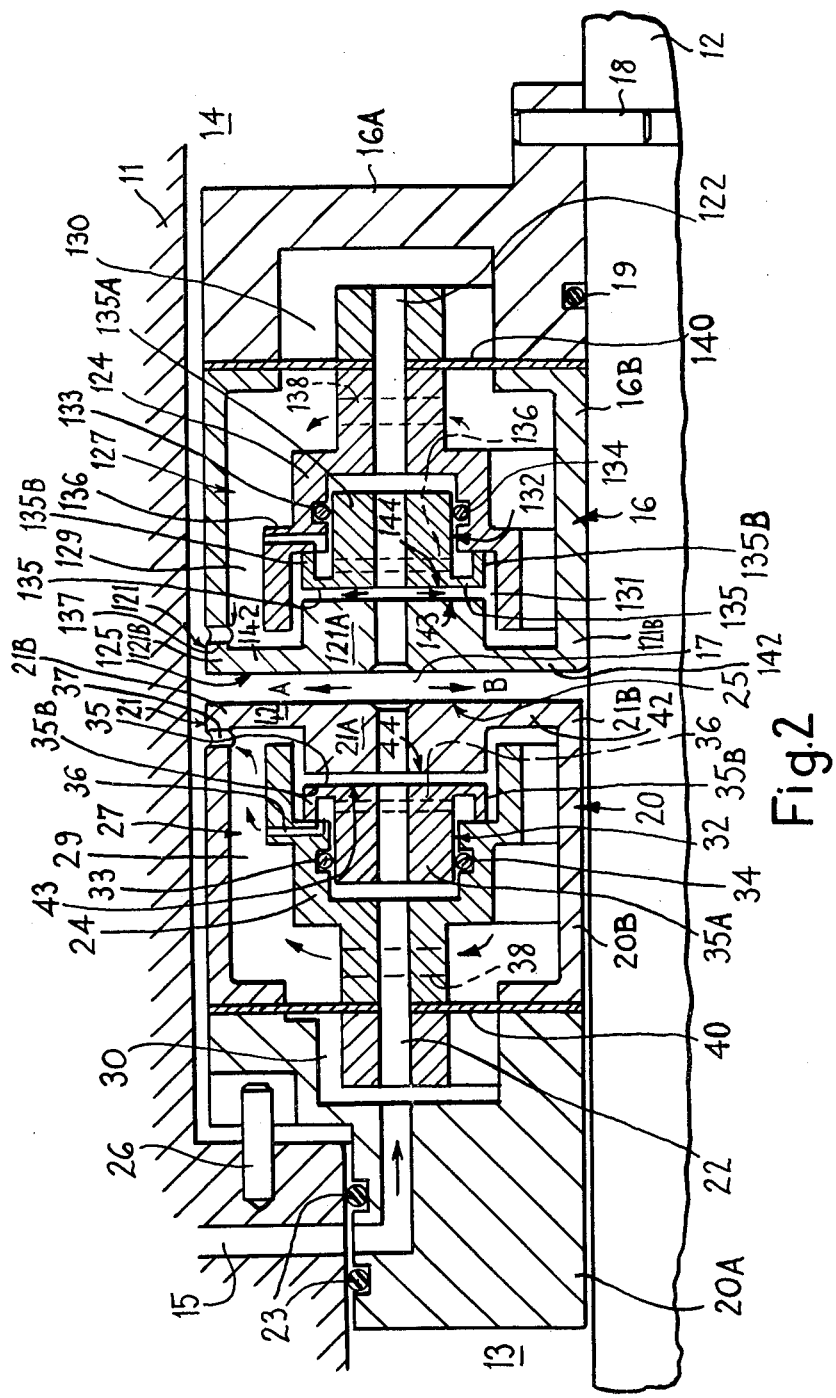
FIGS. 2 and 3 are sections of other embodiments.

The embodiment of FIG. 2, differs essentially from that of FIG. 1 in that the cooling fluid is introduced through passage 22, 122, between the co-operating faces 43, 44 and 143, 144 through an inlet zone located intermediate their outer and inner peripheries instead of at their inner periphery.

In this embodiment the annular part 24, 124 is formed with a stepped, double-walled, annular groove 31, 131 opening only towards the reverse face of the respective working element 21, 121 and is located radially and sealed with respect to the annular carrier member 20B, 16B by means of the flexible diaphragm or membrane seal 40, 140 which also supports the annular carrier member from mounting part 20A of the backplate 20. The annular member 32, 132 is of T-shaped cross-section with the passage 22, 122 passing through the leg part of this T-section member to open onto the respective sealing face 25, 125. The leg part of the T-section member 32, 132 is in axial sliding engagement with the groove 31, 131, and is sealed in the groove by O-rings 33, 133, 34, 134. The leg part of the T-section member which is thick and substantially rigid, constitutes an upstream ring 35A, 135A which is equivalent to the radially inner upstream ring 35A, 135A of FIG. 1. The upstream ring 35A, 135A is joined to rigid radially inner and outer downstream rings 35B, 135B, which are equivalent to the radially outer downstream ring 35B, 135B of FIG. 1, by thinner, flexible, intermediate portions 35, 135, equivalent to the intermediate portion 35, 135 of FIG. 1. Thus, the flow control means of FIG. 2 has two downstream zones.

The working element 21, 121 is also of T-shaped cross-section and its leg-part is thick and substantially rigid and forms an upstream ring 21A, 121A through which the passage 22, 122 extends and which is equivalent to the radially inner upstream ring 21A, 121A of FIG. 1. The upstream ring 21A, 121A is joined by relatively thinner, flexible intermediate portions 42, 142 (equivalent to intermediate portion 42, 142 of FIG. 1) to substantially rigid radially inner and radially outer downstream rings 21B, 121B (equivalent to downstream ring 21B, 121B of FIG. 1). The co-operating faces 43 and 44, 143 and 144 of the flow control means are formed by the opposing faces of the annular member 32, 132 and part of the reverse face of the working element 21, 121, in this case formed by the ring 21A, 121A. In contrast to FIG. 1 the zone 29, 129 in this embodiment has radially inner and outer parts which intercommunicate through radial holes 38, 138 in the annular part 24, 124 and the zone 30, 130 is located axially of the zone 29, 129 and communicates directly with the passage 22, 122.

In the operation of FIG. 2, the flow of cooling fluid is from the passages 22, 122, at the inlet zone of the flow control means, in both radial inward and outward directions to the downstream zones of the flow control means at the outer and inner periphery of the co-operating faces 43, 44 and 143, 144 (the radial inward flow into the inner part of zone 29, 129 escaping through the radial holes 38, 138 to the outer part of zone 29, 129 and thence through holes 37, 137 to region 14).

The inner and outer peripheries of parts 24, 124 may be extended, as shown, towards the reverse face of the working element 21, 121 to cause the fluid to flow in contact with the reverse face of the working element with relatively high velocity.

Although in the embodiments of FIGS. 1 and 2 a flow of cooling fluid has been described both in backplate 20 and in collar 16 to cool both sealing faces 25, 125, the flow could be provided in only one of these members if this gave adequate cooling. Such an arrangement is shown in FIG. 3 in which provision is made for a flow of cooling buffer fluid in the backplate 20, in a similar manner to the embodiment of FIG. 1.

Figure 3:
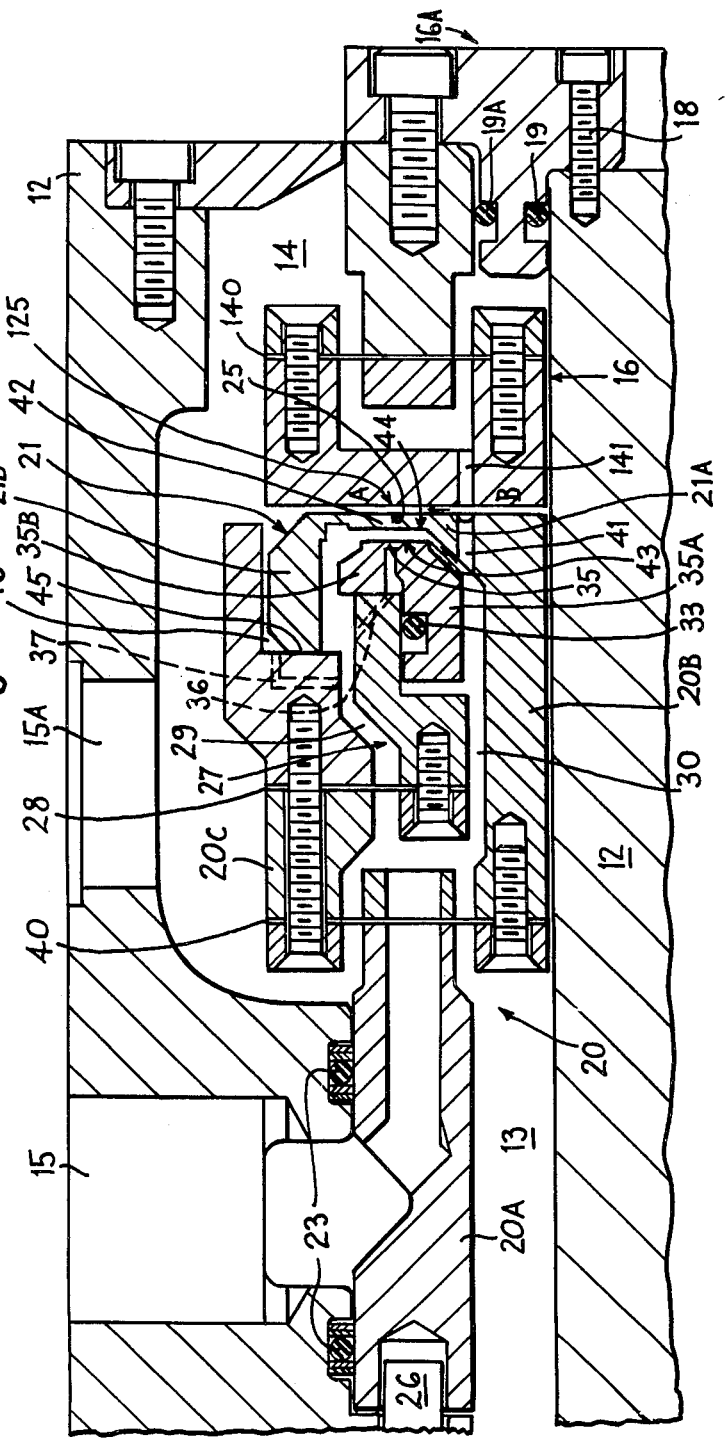

The embodiment of FIG. 3 differs from that of FIG. 1 in that the downstream ring 21B of the working element is extended axially into a stepped annular groove in, and is supported against a radial shoulder 45 of the groove in, the annular carrier member 20B. The ring 21B is formed with a chamfer, providing a space 46 which communicates with zone 29 through holes 37, and there is a clearance between the radially outer periphery of the ring 21B and the adjacent periphery of the stepped groove to communicate the space 46 with the low pressure region 14. A relatively thin flexible upstream annular member 42 is connected to the ring 21B, and constitutes, save for a substantially rigid radially inner annular root part 21A, the reverse face of the working element 21. A part of this flexible annular member 42 forms the face 44 which co-operates with the face 43 formed by the annular member 42 and the whole of the load on the flow control means is transmitted to this part of the flexible annular member 42. In this construction, a relatively small pressure differential can be provided across the said part of the flexible annular member 42 in the upstream and inlet zones respectively of the working element 21 and flow control means. In this embodiment the minimum convergence between the co-operating faces 43, 44 is not at but near the radially outer periphery thereof.

The cooling buffer fluid is conveniently a liquid such as oil or water but may be a gas such as compressed air. Moreover, the buffer fluid may be cooled before supplying it to the seal to enhance cooling.

Various modifications may be made without departing from the scope of the invention as defined in the appended claims. For example, instead of using the buffer fluid as the cooling fluid in a buffer seal, a further fluid which is sealed with respect to the buffer fluid may be used as the cooling fluid. Further in positive clearance radial face seals in which the high pressure sealed fluid is used to restrict leakage from the seal as described in our aforesaid U.K. Patent Specification No. 2033978, the cooling fluid may be introduced from the high pressure region 13 between co-operating faces of the fluid flow control means. In this case the high pressure sealed fluid used for cooling may be fed back to the source of high pressure sealed fluid through a zone at a pressure which is intermediate that of the high and low pressure regions. Instead of the pressure deflectable element comprising a surface member of flexible elastic material as described which provides a convergence of generally tapering configuration, the deflectable element may comprise a piston-like member which has an attached surface membrane and which is movable with respect to the annular part against an elastic load by the pressure distribution between the co-operating faces of the flow control means to provide a convergence of stepped configuration.

I claim:

1. Means for controlling fluid flow over the rear annular face of a working element of a rotary device, comprising a second annular face opposed to, non-rotatable relative to and cooperating with said rear face to define a fluid flow passage, and means for introducing a fluid flow between said faces at an inlet zone of the flow control means so as to flow radially towards at least one downstream zone of the flow control means, said second face comprising a pressure-deflectable element which is elastically loaded towards said rear face and which, in operation, is deflected to provide a clearance between the co-operating faces which is convergent in the radial direction to a minimum clearance towards a downstream zone of the flow control means.

2. Flow control means as claimed in claim 1, characterized in that the pressure-deflectable element comprises an annular member having substantially rigid upstream and downstream rings supporting an intermediate elastic element, the downstream ring being supported by an annular part which radially locates and seals to the upstream ring, whereby to provide a region of low pressure behind at least a part of the deflectable element and to share the load between the upstream and downstream rings.

3. Flow control means as claimed in claim 2, characterized in that the annular part is located radially and sealed by resilient means.

4. Flow control means as claimed in claim 3, characterized in that the resilient means is a flexible diaphragm seal.

5. Flow control means as claimed in claim 2, characterized in that the annular part is mounted on and within an annular carrier member which supports the working element a part of the reverse face of which cooperates with said second face.

6. Flow control means as claimed in claim 5, characterized in that the working element is itself pressure-deflectable whereby to allow movement of the reverse face of the working element, the load on the flow control means being transmitted to the said part of the reverse face of the working element.

7. Flow control means as claimed in claim 6, characterized in that the annular carrier member is axially loaded in the direction of the working element, the working element comprises a substantially rigid downstream ring supported by the annular carrier member and connected to a relatively thin, flexible upstream annular member to a part of which is transmitted the whole of the load on the flow control means and in that a relatively small pressure differential is provided across the said part of the flexible annular member in the upstream and inlet zones respectively of the working element and flow control means.

8. Flow control means as claimed in claim 1, characterized in that the inlet zone is located at one peripheral region of said co-operating faces, the flow control means having one downstream zone located at the other peripheral region of said co-operating faces.

9. Flow control means as claimed in claim 1, characterized in that the inlet zone is located at an intermediate region of said co-operating faces, the flow control means having two downstream zones located at the inner and outer peripheral regions of said co-operating faces.

10. Flow control means as claimed in claim 1, characterized in that the fluid is a buffer fluid fed to the sealing faces of a positive clearance radial face seal.

11. A positive clearance radial face seal including a flow control means as claimed in claim 1.

* * * * *